US012654567B2

(12) United States Patent
Glückler et al.

(10) Patent No.: US 12,654,567 B2
(45) Date of Patent: Jun. 16, 2026

(54) METHOD AND CONTROL DEVICE FOR OPERATING A VEHICLE DRIVELINE

(71) Applicant: ZF Friedrichshafen AG, Friedrichshafen (DE)

(72) Inventors: Johannes Glückler, Friedrichshafen (DE); Christian Mittelberger, Ravensburg (DE); Stefan Spühler, Friedrichshafen (DE); Morten Scherpelz, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 284 days.

(21) Appl. No.: 18/240,543

(22) Filed: Aug. 31, 2023

(65) Prior Publication Data

US 2024/0067000 A1     Feb. 29, 2024

(30) Foreign Application Priority Data

Aug. 31, 2022     (DE) ..................... 10 2022 209 052.7

(51) Int. Cl.
B60L 15/20          (2006.01)

(52) U.S. Cl.
CPC ..... B60L 15/2054 (2013.01); B60L 2240/423 (2013.01); B60L 2240/48 (2013.01)

(58) Field of Classification Search
CPC .......... B60L 15/2054; B60L 2240/423; B60L 2240/48
See application file for complete search history.

(56) References Cited

U.S. PATENT DOCUMENTS

| 2,037,126 A | 4/1936 | Ford |
|---|---|---|
| 5,879,265 A | 3/1999 | Bek |

(Continued)

FOREIGN PATENT DOCUMENTS

| CN | 201720039828 U | 12/2017 |
|---|---|---|
| CN | 201711214758 A | 5/2018 |

(Continued)

OTHER PUBLICATIONS

German Patent Office, Search Report issued in German patent application No. 10 2022 209 050.0 (Jul. 24, 2023).

(Continued)

*Primary Examiner* — Justin S Lee
(74) *Attorney, Agent, or Firm* — Secant IP, PLLC

(57) ABSTRACT
A vehicle powertrain has a first electrical machine with first power electronics, a second electrical machine with second power electronics, and a transmission connected between the electrical machines and an output. In symmetrical operation, the first and the second electrical machine are operated with an equal torque and torque gradient. When executing a shift non-symmetrical operation, the first and the second electrical machines are operated with different torque and/or torque gradient. During a symmetrical operation if it is detected that a shift with a non-symmetrical operation is to be executed, the symmetrical operation is exited prior to executing the shift to provide a mode in which the electrical machine operated with higher torque and/or torque gradient, is operated with limited torque and/or torque gradient to reduce a temperature of the electrical machine and the associated power electronics operated with a higher torque and/or torque gradient.

9 Claims, 2 Drawing Sheets

(56) References Cited

U.S. PATENT DOCUMENTS

| | | | |
|---|---|---|---|
| 6,557,656 B2 | 5/2003 | Haniu et al. | |
| 7,220,203 B2 | 5/2007 | Holmes et al. | |
| 7,363,996 B2 | 4/2008 | Kamada et al. | |
| 7,387,585 B2 | 6/2008 | Bucknor et al. | |
| 7,479,081 B2 | 1/2009 | Holmes | |
| 7,594,869 B2 | 9/2009 | Holmes | |
| 7,695,387 B2 | 4/2010 | Oba | |
| 7,967,711 B2 | 6/2011 | Conlon et al. | |
| 8,091,661 B2 | 1/2012 | Oba et al. | |
| 8,512,187 B2 | 8/2013 | Puiu et al. | |
| 8,528,676 B2 | 9/2013 | Endo et al. | |
| 9,566,857 B1 | 2/2017 | Pritchard et al. | |
| 10,968,983 B2 | 4/2021 | Hara et al. | |
| 11,002,350 B2 | 5/2021 | Waltz | |
| 11,124,064 B2 | 9/2021 | Kaltenbach et al. | |
| 11,156,280 B2 | 10/2021 | Kurth | |
| 11,364,784 B2 | 6/2022 | Kaltenbach et al. | |
| 11,365,785 B2 | 6/2022 | Kumar et al. | |
| 11,472,277 B2 | 10/2022 | Glückler et al. | |
| 2006/0025263 A1 | 2/2006 | Sowul et al. | |
| 2009/0036263 A1 | 2/2009 | Iwase et al. | |
| 2009/0082154 A1 | 3/2009 | Iwase et al. | |
| 2011/0259657 A1 | 10/2011 | Fuechtner | |
| 2019/0143821 A1* | 5/2019 | Bell | B60W 10/08 180/65.225 |
| 2020/0400217 A1 | 12/2020 | Billich | |
| 2021/0188066 A1 | 6/2021 | McGrew et al. | |
| 2021/0372506 A1 | 12/2021 | McGrew, Jr. et al. | |
| 2022/0186468 A1 | 6/2022 | Glöckner et al. | |
| 2022/0364631 A1 | 11/2022 | Glückler et al. | |
| 2022/0409500 A1 | 12/2022 | Lechner | |

FOREIGN PATENT DOCUMENTS

| | | | | |
|---|---|---|---|---|
| CN | 208630340 U | 3/2019 | | |
| DE | 1505723 | 7/1970 | | |
| DE | 10 2011 088 647 A1 | 6/2013 | | |
| DE | 10 2012 204 717 A1 | 9/2013 | | |
| DE | 10 2012 219 125 | 4/2014 | | |
| DE | 10 2015 215 393 A1 | 9/2016 | | |
| DE | 10 2018 001 508 B3 | 5/2019 | | |
| DE | 10 2017 011 387 A1 | 6/2019 | | |
| DE | 10 2020 203 669 A1 | 9/2021 | | |
| DE | 10 2020 215 124 A1 | 6/2022 | | |
| DE | 102020216373 A1 * | 6/2022 | | B60L 15/20 |
| EP | 3587157 B1 | 6/2021 | | |
| WO | 2019/115204 A1 | 6/2019 | | |
| WO | WO-2019219214 A1 * | 11/2019 | | H02P 29/68 |
| WO | 2020/030212 A1 | 2/2020 | | |
| WO | 2021063789 A1 | 4/2021 | | |

OTHER PUBLICATIONS

United States Patent and Trademark Office, Office Action issued in U.S. Appl. No. 18/192,018 (Sep. 25, 2023).

United States Patent and Trademark Office, Notice of Allowance issued in U.S. Appl. No. 18/192,044 (Oct. 1, 2024).

United States Patent and Trademark Office, Ex Parte Quayle Action issued in U.S. Appl. No. 18/240,530 (Jun. 11, 2025).

German Patent Office, Search Report issued in German patent application No. 10 2022 209 051.9 (Mar. 29, 2023).

German Patent Office, Search Report issued in German patent application No. 10 2022 209 052.7 (Mar. 15, 2023).

* cited by examiner

METHOD AND CONTROL DEVICE FOR OPERATING A VEHICLE DRIVELINE

RELATED APPLICATIONS

This application claims the benefit of and right of priority under 35 U.S.C. § 119 to German Patent Application no. 10 2022 209 052.7, filed on 31 Aug. 2022, the contents of which are incorporated herein by reference in its entirety.

FIELD OF THE DISCLOSURE

The invention relates to a method for operating a powertrain of a vehicle. The invention further relates to a control device for operating a powertrain of a vehicle.

BACKGROUND

DE 10 2019 214 986 A1 and DE 10 2019 216 562 A1 each disclose a powertrain of a vehicle designed as an electrical vehicle with a first electrical machine and a second electrical machine, wherein a transmission is connected between the two electrical machines and an output on which both electrical machines act together.

It is known from practical experience that a powertrain of a vehicle with two electrical machines can be operated both in symmetrical operation of the electrical machines and in non-symmetrical operation of the electrical machines. In a symmetrical operation of the electrical machines, the first electrical machine and the second electrical machine are each loaded or operated with an equal torque and an equal torque gradient. In this case, a thermal load of the electrical machines as well as of power electronics assigned to the electrical machines is then also identical. In a non-symmetrical operation of the electrical machines, the electrical machines are loaded or operated with different torques and/or different torque gradients, which then results in different thermal loads for the same and the power electronics interacting with the same.

An aging state of the respective assembly depends on the thermal load of an electrical machine or its power electronics. Different aging states of the electrical machines as well as of the power electronics interacting with the electrical machines reduce the overall service life of the powertrain.

From DE 10 2019 214 986 A1 and DE 10 2019 216 562 A1, it is known that for the execution of a shift in the transmission connected between the electrical machines and the output, the powertrain, namely, the two electrical machines thereof, are operated in a non-symmetrical operation, whereby one of the electrical machines is used as the main drive machine, and where the respective other electrical machine is used for traction assistance during the shift operations. Such powershifts are also called electrodynamic shifts.

SUMMARY

Accordingly, in a non-symmetrical operation of the electrical machines during the execution of a shift in the transmission, one of the electrical machines is loaded or operated with a higher torque and/or a higher torque gradient compared to the respective other electrical machine, whereby this electrical machine and the power electronics interacting with the same are then exposed to a higher thermal load and age faster.

There is a need to limit differential thermal stress caused as a result of non-symmetrical operation of the powertrain, and thus differential aging of the electrical machines and the power electronics interacting with the electrical machines, in order to increase the overall life of the powertrain. Proceeding from this, the invention is based on the task of creating a novel method and control device for operating a powertrain of a vehicle.

This task is solved by a method of operating a vehicle driveline as disclosed herein. According to the invention, if during a symmetrical operation of the electrical machines it is detected that a shift with a non-symmetrical operation of the electrical machines is to be executed in the transmission, the symmetrical operation of the electrical machines is exited to provide a preconditioning operation of the electrical machines before the execution of the shift.

In the preconditioning mode of the electrical machines, the electrical machine that is loaded or operated with a higher torque and/or with a higher torque gradient, compared to the other electrical machine during the execution of the shift, is loaded or operated with a limited torque and/or with a limited torque gradient in order to reduce, via the preconditioning mode, a temperature of the electrical machine loaded or operated with the higher torque and/or with the higher torque gradient, compared to the other electrical machine during the execution of the shift, and a temperature of the power electronics associated with this electrical machine before the execution of the shift.

With the present invention, it is proposed that if it is detected during the symmetrical operation of the electrical machines of the powertrain that a shift is to be executed in the transmission in the non-symmetrical operation of the electrical machines of the powertrain, then the symmetrical operation of the electrical machines is selectively exited before execution of the shift in order to reduce, via a preconditioning operation of the electrical machines of the powertrain, the thermal load of that electrical machine which, during the execution of the shift in the transmission, is loaded or operated with a higher torque and/or a higher torque gradient compared to the other electrical machine.

The present invention can be used to lower the temperature level to which the electrical machine or its power electronics, which are more heavily loaded during shift execution, are heated.

Furthermore, despite non-symmetrical operation of the electrical machines of the powertrain, the thermal loads of the two electrical machines as well as their power electronics can be matched with the present invention. Overall, this can increase the total service life of the powertrain.

Preferably, during the preconditioning operation of the electrical machines of the powertrain, the torque and/or the torque gradient of that electrical machine which is loaded or operated with a higher torque and/or with a higher torque gradient compared to the other electrical machine during the execution of the shift is limited in such a way that the torque and/or the torque gradient of this electrical machine is reduced compared to the symmetrical operation of the powertrain. This can advantageously reduce the thermal load of the electrical machine loaded or operated with a higher torque and/or with a higher torque gradient during the shift execution compared to the other electrical machine.

Preferably, during the preconditioning operation of the electrical machines of the powertrain, the torque and/or the torque gradient of that electrical machine which is loaded or operated with a lower torque and/or with a lower torque gradient compared to the other electrical machine during the execution of the shift is increased compared to the symmetrical operation of the powertrain in order to at least partially compensate for the limitation of torque and/or torque gradient of the other electrical machine. This serves to ensure that the preconditioning operation of the electrical machines of the powertrain does not reduce the performance of the vehicle's powertrain, or only to a limited extent.

Preferably, the preconditioning operation of the electrical machines of the powertrain is used when the limitation of the torque and/or torque gradient of that electrical machine which is loaded or operated with a higher torque and/or with a higher torque gradient compared to the other electrical machine during the execution of the shift can be compensated by the other electrical machine by more than a predetermined proportion, preferably completely. Again, this serves to either limit or completely eliminate the effect of preconditioning operation on the vehicle's performance.

Preferably, if during a symmetrical operation of the electrical machines of the powertrain it is detected that in the transmission a shift is to be executed with or in a non-symmetrical operation of the electrical machines, a target temperature reduction is determined for the preconditioning operation of the electrical machines for the electrical machine loaded or operated during the execution of the shift with a higher torque and/or with a higher torque gradient compared to the other electrical machine or for the power electronics assigned to this electrical machine, the limitation of torque and/or torque gradient of the electrical machine being determined as a function of the target temperature reduction. Then, if it is determined that the limitation of torque and/or torque gradient determined for the preconditioning operation of the electrical machines of that electrical machine which is loaded or operated during the execution of the shift with a higher torque and/or with a higher torque gradient compared to the other electrical machine, cannot be fully compensated by the other electrical machine in the preconditioning operation, either the limitation determined for the preconditioning operation is nevertheless fully implemented while reducing the performance of the powertrain or, alternatively, the limitation is adapted for the preconditioning operation in such a way that the performance of the powertrain remains unchanged. This makes it possible to specifically limit the torque and/or torque gradient via the target temperature reduction. If the limitation of torque and/or torque gradient dependent on the target temperature reduction cannot be fully compensated by the respective other electrical machine, the limitation of torque and/or torque gradient can either be fully implemented while reducing the performance or only partially implemented to avoid a reduction in the performance of the powertrain.

The present disclosure is also directed to a control device for operating a vehicle driveline.

BRIEF DESCRIPTION OF THE DRAWINGS

Preferred further embodiments result from the subclaims and the following description. Exemplary embodiments of the invention are explained in more detail, without being limited thereto, by reference to the drawing. It shows:

DETAILED DESCRIPTION

Figure 1:
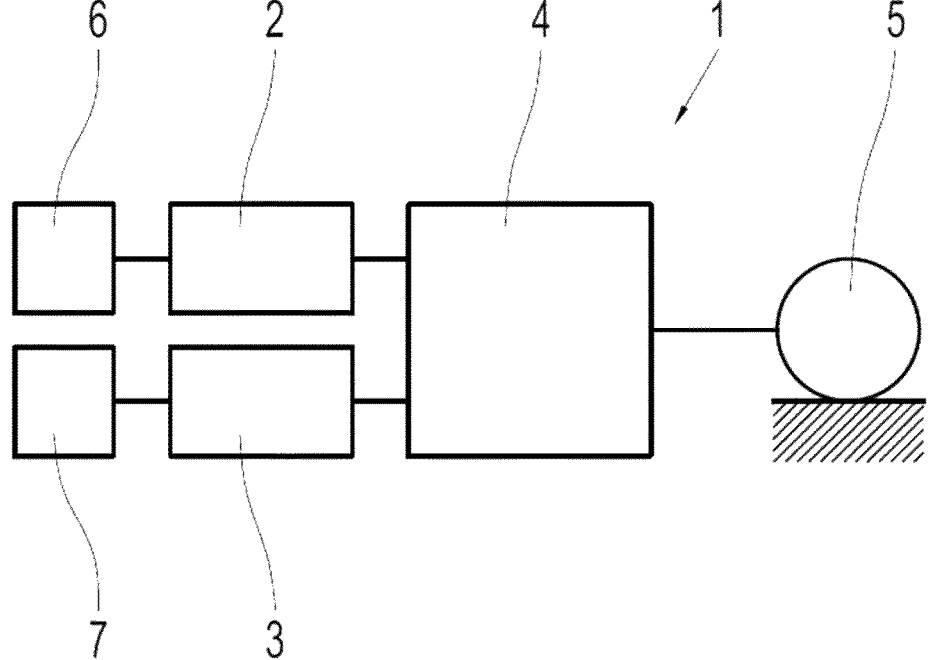
FIG. 1 is a block diagram of a powertrain of a prior art vehicle.

FIG. 1 shows a highly schematized block diagram of a powertrain 1 of a motor vehicle designed as an electrical vehicle. The powertrain 1 has a first electrical machine 2 and a second electrical machine 3, whereby both electrical machines 2, 3 are operatively connected to a common transmission 4 and can provide input power to a common output 5 via the common transmission 4. A first power electronics 6 interacts with the first electrical machine 2 and a second power electronics 7 interacts with the second electrical machine 3. In this context, the powertrain of FIG. 1 can be designed as in DE 10 2019 214 986 A1 or DE 10 2019 216 562 A1. These powertrain configurations are examples only, however.

In a symmetrical operation of the electrical machines 2, 3 the first electrical machine 2 and the second electrical machine 3 are loaded or operated with an equal torque and an equal torque gradient. As a result of symmetrical operation, the two electrical machines 2, 3 and the power electronics 6, 7 interacting with them are subjected to the same thermal load. In a non-symmetrical operation of the electrical machines 2, 3 the first electrical machine 2 and the second electrical machine 3 are loaded or operated with a different torque and/or with a different torque gradient, in such a way that one electrical machine is loaded or operated with a higher torque and/or a higher torque gradient compared to the respective other electrical machine.

As a result of such non-symmetrical operation, the electrical machines 2, 3 and the power electronics 6, 7 assigned to them are then subjected to different thermal loads.

Non-symmetrical operation of the powertrain is required in particular when a powershift is executed in the transmission 4. Such powershift is referred to as electrodynamic shifts, in which one of the electrical machines is operated as the main driving machine, while the other electrical machine is used for traction assistance during shift processes. Which of these two electrical machines is loaded or operated with a higher torque and/or torque gradient during non-symmetrical operation of the powertrain compared to the other electrical machine depends on the specific configuration of the powertrain. In the case of the powertrains according to DE 10 2019 214 985 A1 as well as according to DE 10 2019 216 562 A1, this is the electrical machine that is used for traction assistance during the shift execution.

Figures 2, 3:
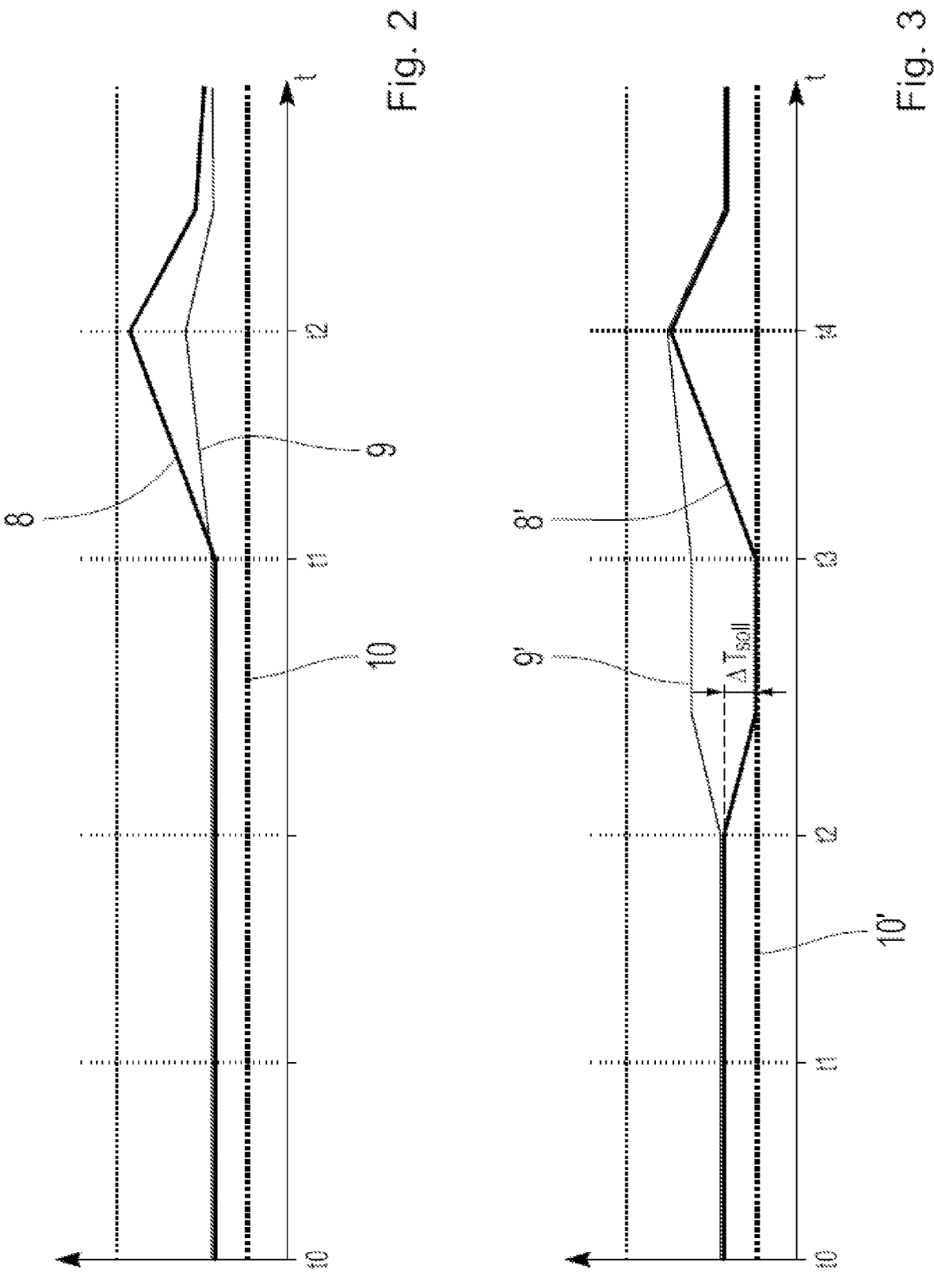
FIG. 2 is an exemplary time curve of temperatures formed according to the prior art.
FIG. 3 is an exemplary time curve of temperatures formed according to the invention.

FIG. 2 shows temperature curves 8, 9 for the electrical machines 2, 3 and for the power electronics 6, 7 interacting with the electrical machines 2, 3, respectively, which can be formed if, according to the prior art, the electrical machines 2, 3 are operated in a symmetrical mode between the times t0 and t1 and in a non-symmetrical mode between the times t1 and t2 in a shift execution. A curve 10 visualizes a temperature of a cooling medium. Then, if the electrical machines 2, 3 are operated in symmetrical mode between the times t0 and t1, the thermal load of the electrical machines 2, 3 or the power electronics 6, 7 is identical. In this case, the same then have identical temperatures.

Between times t1 and t2, the electrical machines 2, 3 are then operated non-symmetrically, with one of the electrical machines then being loaded or operated with a higher torque and/or torque gradient compared to the other electrical machine. The temperatures of the electrical machines 2, 3 and the power electronics 6, 7 deviate from each other according to the curves 8, 9.

Belonging to that electrical machine which is loaded or operated with a higher torque and/or a higher torque gradient during the non-symmetrical operation, compared to the other electrical machine, is the temperature curve 8, said machine being accordingly heated up to a higher temperature level until time t2. Consequently, the thermal load of this electrical machine or this power electronics, to which the temperature curve 8 belongs, is greater than the thermal load of the electrical machine or the power electronics, to which the temperature curve 9 belongs.

If, after time t2, symmetrical operation is resumed, the temperatures of the electrical machines 2, 3 and thus their power electronics 6, 7 then approach each other again according to the temperature curves 8, 9. However, as a result of the different temperature levels to which the electrical machines or power electronics were heated at time t2, they have different aging indices or different service life damage, i.e., they have aged differently.

According to the invention, in order to counteract such a different thermal load and different aging of the electrical machines 2, 3 and the power electronics 6, 7 associated with the same, if during a symmetrical operation of the powertrain 1 it is detected that in the transmission 4 a shift is to be executed in a non-symmetrical operation the electrical machines 2, 3 of the powertrain 1, the symmetrical operation is exited before the execution of the shift, providing a preconditioning operation of the electrical machines 2, 3 of the powertrain 1.

In the preconditioning operation of the electrical machines 2, 3 the electrical machine which is loaded or operated with a higher torque and/or with a higher torque gradient compared to the other electrical machine during the execution of the shift is loaded or operated with a limited torque and/or with a limited torque gradient which is reduced compared to the torque and/or torque gradient of the symmetrical operation.

Hereby, via the preconditioning operation of the electrical machines 2, 3 a temperature of the electrical machine loaded or operated with the higher torque and/or with the higher torque gradient compared to the other electrical machine during the execution of the shift and of the power electronics assigned to this electrical machine can be reduced before the execution of the shift. This is described further below with reference to FIG. 3, where in FIG. 3 the curves 8' and 9' are temperature curves that can be formed when the method according to the invention is used, and where the curve 10' again corresponds to a coolant temperature.

In FIG. 3, the powertrain 1 is operated in a symmetrical mode between the times t0 and t2 and after the time t4, in which the first electrical machine 2 and the second electrical machine 3 are thus loaded or operated with the same torque and the same torque gradient, such that their thermal loads are identical, and their temperatures develop identically.

In FIG. 3, at time t1, for example, based on shift control software, it is recognized that beginning with time t3, a shift in transmission 4 is to be performed in a nonsymmetrical operation of electrical machines 2, 3 of powertrain 1. Prior to time t3, that is, prior to the execution of the shift in transmission 4, the symmetrical operation of the electrical machines 2, 3 is then exited at time t2 to provide the preconditioning operation of the electrical machines 2, 3. In FIG. 3, the preconditioning operation occurs between times t2 and t3.

Between times t2 and t3, the electrical machine which is loaded or operated with a higher torque and/or a higher torque gradient during the execution of the shift between times t3 and t4, and which is consequently subjected to a higher thermal load, is operated with a limited torque and/or a limited torque gradient. FIG. 3 shows that between the times t2 and t3 the temperature level according to the curve 8' for the electrical machine with higher load in the shift execution is lowered compared to the temperature level of the symmetrical operation at time t2.

Starting at time t3, the electrical machine or the power electronics associated with it, which are more heavily loaded during the shift execution, are heated from a lower temperature level, such that the electrical machine or the power electronics, which are more heavily loaded during the shift execution, are heated to a lower temperature level.

As can be seen from FIG. 3, during the preconditioning operation of the electrical machines 2, 3 between the times t2 and t3, the torque and/or the torque gradient of that electrical machine which during the execution of the shift between the times t3 and t4 is loaded or operated with a lower torque and/or with a lower torque gradient compared to the other electrical machine is increased or raised compared to the symmetrical operation of the electrical machines 2, 3 of the powertrain, such that in the preconditioning operation of the electrical machines 2, 3 between the times t2 and t3 this electrical machine is then subjected to a higher thermal load. This is done with the aim of at least partially compensating, preferably fully compensating, the limitation of the torque and/or the torque gradient of that electrical machine which is more heavily loaded during shift execution and is limited in terms of its torque and/or torque gradient during preconditioning operation.

The preconditioning operation of the electrical machines 2, 3 is preferably used if the limitation of the torque and/or the torque gradient of that electrical machine 2, 3 which is loaded or operated during the execution of the shift with a higher torque and/or higher torque gradient compared to the other electrical machine 3, 2 and is consequently subjected to a higher thermal load, can be compensated by the other electrical machine by more than a defined proportion, preferably completely. This can then ensure that the performance of the powertrain 1 is not reduced or is reduced only to a defined extent.

Then, if during a symmetrical operation of the powertrain, in FIG. 1 at time t1, it is detected that a shift with a non-symmetrical operation of the electrical machines 2, 3 of the powertrain 1 is to be executed in the transmission 4 at time t3, a target temperature reduction can be determined for the preconditioning operation for the electrical machine loaded or operated with a higher torque and/or with a higher torque compared to the other electrical machine during the execution of the shift. This target temperature reduction is marked as ATTARGET in FIG. 3. Depending on this target temperature reduction ATTARGET for example, a reduction of torque and/or torque gradient can be determined in a diagram-dependent or characteristic curve-dependent manner for the electrical machine loaded or operated with the higher torque and with the higher torque gradient compared to the other electrical machine during the execution of the shift, which provides the target temperature reduction ATTARGET. If this reduction in torque and/or torque gradient cannot be fully compensated for in the preconditioning operation by the other electrical machine, which is loaded less in the shift design, pro-vision can be made for the limitation determined for the preconditioning operation to be carried out fully nevertheless, while reducing the performance of the powertrain. In this case, the focus is then on limiting the temperature level for the electrical machine that is more heavily loaded during shift execution.

Alternatively, if the limitation of the torque and/or torque gradient cannot be fully compensated by the electrical machine that is less loaded during shift execution, the limitation can be adjusted for the preconditioning operation such that the performance of the powertrain remains unchanged. In this case, a greater thermal load is then allowed on that electrical machine which is loaded or operated with a higher torque and/or with a higher torque gradient, and consequently more heavily, during the shift execution compared to the other electrical machine.

In FIG. 3, the two electrical machines 2, 3 or the power electronics 6, 7 interacting with them feature an identical temperature level at time t4. However, this is purely exemplary in nature. Of course, the temperature levels of the electrical machines 2, 3 or the power electronics 6, 7 at time t4 may differ.

The invention further relates to a control device which is set up to automatically execute the above-described method. This control unit can in particular be a control device which controls and/or regulates the operation of the electrical machines 2, 3 and distributes the drive power or a required torque between the two electrical machines 2, 3. Such a control device is preferably an electronic control device which has means on the hardware side and means on the software side for executing the method according to the invention. The hardware-side means include data interfaces for ex-changing data with the assemblies involved in carrying out the method according to the invention, for example with the electrical machines 2, 3 and/or the power electronics 6, 7. The hardware-side means also include a processor for data processing and a memory for data storage. Software-side means include program modules implemented in the control device for carrying out the method according to the invention.

Then, during a symmetrical operation of the electrical machines, if the control device detects that a shift with a non-symmetrical operation of the electrical machines 2, 3 is to be executed in the transmission 4, the control device controls the electrical machines 2, 3 in such a way that the symmetrical operation of the electrical machines 2, 3 is exited in order to provide a preconditioning operation before executing the shift. In the preconditioning operation, the control device controls that electrical machine 2, 3 which is loaded or operated with a higher torque and/or with a higher torque gradient compared to the other electrical machine 2, 3 during the execution of the shift, with a limited torque and/or with a limited torque gradient in order to reduce, via the preconditioning mode, a temperature of the electrical machine 2, 3 loaded or operated with the higher torque and/or with the higher torque gradient compared to the other electrical machine during the execution of the shift and of the power electronics 6, 7 assigned to this electrical machine before the execution of the shift.

The invention can counteract the problem of different thermal stress and different aging of electrical machines and of power electronics interacting with the electrical machines. Pre-conditioning of the electrical machines and power electronics prior to execution of an electrodynamic shift in non-parallel operation of the electrical machines can be used to equalize the thermal load of the electrical machines and the power electronics in order to also equalize their aging and thus service life damage and thus ensure maximum service life and thus operating life of a powertrain.

LIST OF REFERENCE NUMERALS 1 powertrain
2 electrical machine
3 electrical machine
4 transmission
5 output
6 power electronics
7 power electronics 8 temperature curve
8' temperature curve
9 temperature curve
9' temperature curve
10 temperature curve
10' temperature curve

The invention claimed is:

1. A method for operating a powertrain of a vehicle having a first electrical machine with first power electronics, a second electrical machine with second power electronics, and a transmission connected between the electrical machines and an output, the method comprising:

operating the electrical machines of the powertrain in symmetrical operation in which the first electrical machine and the second electrical machine are loaded or operated with an equal torque and with an equal torque gradient;

detecting, during the symmetrical operation of the electrical machines, that a shift with a non-symmetrical operation of the electrical machines is to be executed in the transmission;

exiting, prior to the execution of the shift, the symmetrical operation of the electrical machines to provide a preconditioning mode of operation;

executing the shift in the transmission with a non-symmetrical operation of the electrical machines in which the first electrical machine and the second electrical machine are loaded or operated with a different torque and/or with a different torque gradient; and operating the electrical machines in the preconditioning mode prior to executing the shift, in which one of the electrical machines which is loaded or operated during the execution of the shift with a higher torque and/or with a higher torque gradient compared to an other of the electrical machines loaded or operated with a limited torque and/or with a limited torque gradient, thereby reducing a temperature of the one of the electrical machines loaded or operated during the execution of the shift with the higher torque and/or higher torque gradient compared to the other of the electrical machines and compared to a temperature of the power electronics associated with the one of the electrical machines.

2. The method according to claim 1, wherein operating the electrical machines in the preconditioning mode includes limiting the torque and/or the torque gradient of the one of the electrical machines which is loaded or operated during the execution of the shift with the higher torque and/or with the higher torque gradient compared to the other of the electrical machines, such that the torque and/or the torque gradient of the one of the electrical machines is reduced compared to the symmetrical operation.

3. The method according to claim 2, wherein operating the electrical machines in the preconditioning mode, the torque and/or the torque gradient of the other of the electrical machines which is loaded or operated with a lower torque and/or with a lower torque gradient compared to the one of the electrical machines during the execution of the shift is increased compared to the symmetrical operation of the powertrain in order to at least partially compensate for the limitation of torque and/or torque gradient of the one of the electrical machines.

4. The method according to claim 1, wherein operating the electrical machines in the preconditioning mode is performed when the limitation of the torque and/or torque gradient of the one of the electrical machines which is loaded or operated during the execution of the shift with the higher torque and/or with the higher torque gradient compared to the other of the electrical machines can be compensated by the other electrical machine by more than a predetermined proportion.

5. The method according to claim 4, wherein operating the electrical machines in the preconditioning mode is performed exclusively after determining that the limitation of the torque and/or torque gradient of the one of the electrical machines which is loaded or operated with the higher torque and/or with the higher torque gradient compared to the other of the electrical machines during the execution of the shift can be fully compensated by the other of the electrical machines.

6. The method according to claim 1, comprising:

detecting, during a symmetrical operation of the electrical machines, that in the transmission a shift with a non-symmetrical operation of the electrical machines is to be executed; and determining, for the preconditioning mode, a target temperature reduction for the one of the electrical machines that is loaded or operated during the execution of the shift with the higher torque and/or the higher torque gradient compared to the other of the electrical machines, or for the power electronics assigned to the respective electrical machine;

wherein limiting the torque and/or the torque gradient of the one of the electrical machines is determined as a function of the target temperature reduction.

7. The method according to claim 6, comprising:

determining, for the preconditioning mode, that the limitation of torque and/or torque gradient of the one of the electrical machines which is loaded or operated during the execution of the shift with the higher torque and/or with the higher torque gradient compared to the other of the electrical machines cannot be fully compensated by the other of the electrical machines in the preconditioning mode; and limiting the torque and/or the torque gradient as determined for the preconditioning mode while reducing a performance of the powertrain.

8. The method according to claim 6, comprising:

determining that the limitation of torque and/or torque gradient as determined for the preconditioning mode of the one of the electrical machines which is loaded or operated during the execution of the shift with a higher torque and/or with a higher torque gradient compared to the other of the electrical machines cannot be fully compensated by the other of the electrical machines in the preconditioning mode of operation; and adapting the limitation of the torque and/or the torque gradient for the preconditioning mode so that the performance of the powertrain remains unchanged.

9. A control device of a vehicle, the control device configured to automatically execute the method according to claim 1.

\* \* \* \* \*